United States Patent
Nozaki et al.

(10) Patent No.: US 6,679,003 B2
(45) Date of Patent: Jan. 20, 2004

(54) DOOR FRAME STRUCTURE OF MOTOR VEHICLE

(75) Inventors: Masahiro Nozaki, Nishikasugai-gun (JP); Katsunori Kawai, Nishikasugai-gun (JP)

(73) Assignee: Yotoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/075,993

(22) Filed: Feb. 15, 2002

(65) Prior Publication Data

US 2002/0108313 A1 Aug. 15, 2002

(30) Foreign Application Priority Data

Feb. 15, 2001 (JP) ........................................ 2001-038502
Jul. 12, 2001 (JP) ........................................ 2001-211668

(51) Int. Cl.⁷ .............................................. E05D 15/16
(52) U.S. Cl. ........................ 49/441; 49/490.1; 49/495.1; 49/475.1
(58) Field of Search ............................ 49/495.1, 475.1, 49/440, 441, 490.1

(56) References Cited

U.S. PATENT DOCUMENTS

| | | | | |
|---|---|---|---|---|
| 5,027,556 A | * | 7/1991 | Ginster | 49/441 |
| 5,038,521 A | * | 8/1991 | Andrzejewski et al. | 49/441 |
| 5,207,029 A | | 5/1993 | Nozaki et al. | |
| 5,743,047 A | * | 4/1998 | Bonne et al. | 49/490.1 |
| 5,806,247 A | * | 9/1998 | Yamamoto | 49/495.1 |
| 6,409,251 B1 | * | 6/2002 | Kaye et al. | 49/495.1 |

FOREIGN PATENT DOCUMENTS

| | | |
|---|---|---|
| DE | 4028898 A1 | 3/1992 |
| DE | 4314123 A1 | 11/1994 |
| DE | 19625593 A1 | 1/1997 |

* cited by examiner

*Primary Examiner*—Jerry Redman
(74) *Attorney, Agent, or Firm*—Posz & Bethards, PLC

(57) ABSTRACT

A door frame structure of a vehicle, of which a door frame is covered with a frame molding. The door frame has a flat peripheral wall extending around a window opening of a vehicle door and a protrusion protruding from an inside end of the flat peripheral wall. The frame molding is composed of a synthetic resin or TPO and is attached to an outside end of the peripheral wall of the door frame. A pair of shelf projections are integrally formed on an inside surface of the frame molding from about a widthwise center thereof so as to be spaced from each other. By press-inserting the flat peripheral wall of the door frame between the shelf projections of the frame molding, the frame molding is secured to the door frame. A glass run having seal lips for sealing a door glass is fitted in a channel having a U-shaped cross-section, which is defined by the protrusion and the flat peripheral wall of the door frame, and an inner half part of the frame molding, which protrudes into the window opening inwardly of the outside end of the flat peripheral wall of the door frame.

9 Claims, 6 Drawing Sheets

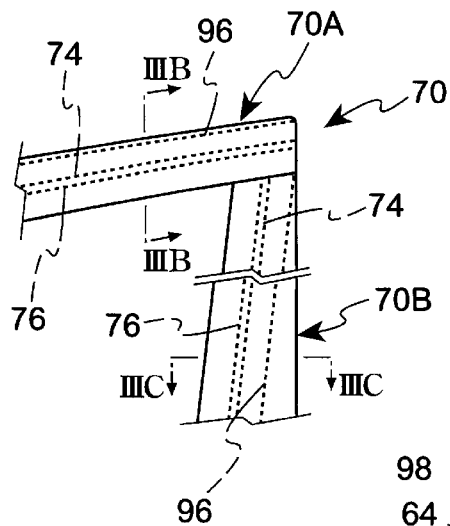
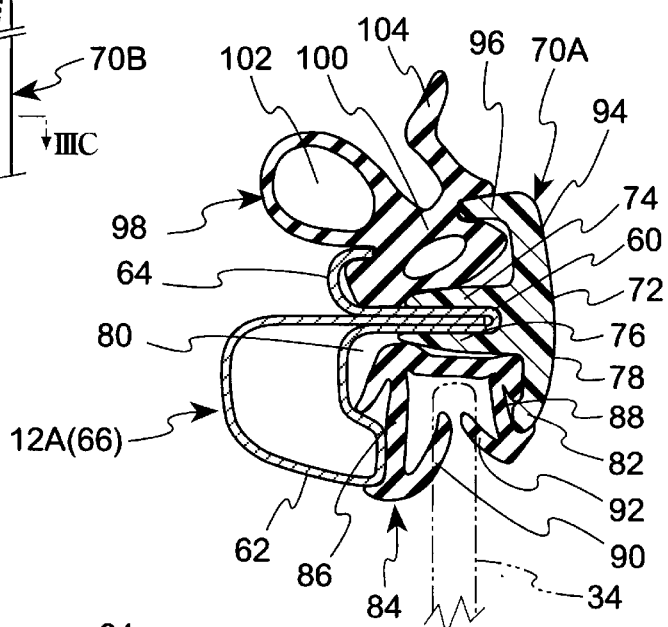
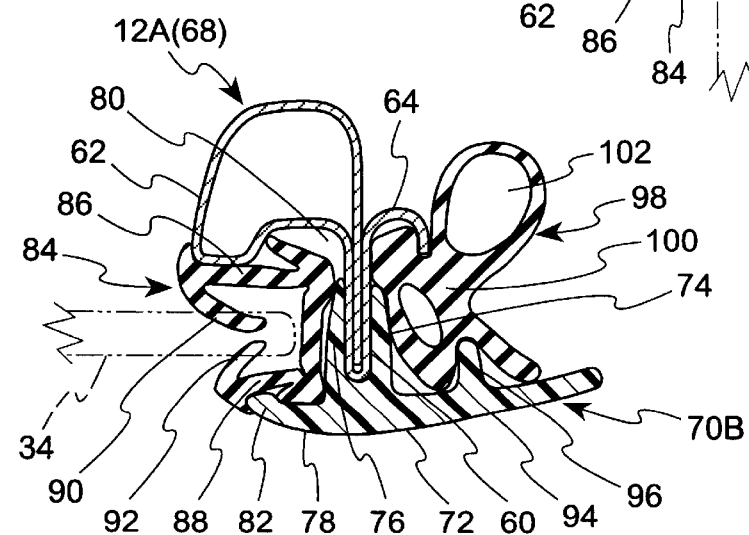

DOOR FRAME STRUCTURE OF MOTOR VEHICLE

CROSS-REFERENCE TO RELATED APPLICATION

This application is related to and claims priority from Japanese patent applications Nos. 2001-38502 and 2001-211668, incorporated herein by reference.

BACKGROUND OF THE INVENTION

1. Field of the Invention

The present invention relates to a door frame structure of a motor vehicle and, more particularly, to a door frame structure having a frame moulding.

2. Description of Related Art

As shown in FIG. 1, a door 10 of a motor vehicle has a door frame 12 around a window opening 14. And a glass run (not shown) is attached to an inner side of the door frame 12 while a door weather strip (not shown) is attached to an outer side of the door frame 12.

FIG. 2 illustrates one example of a conventional door frame structure of a vehicle, which is taken along the line X—X of FIG. 1. As shown, the door frame 12 is composed of a metal plate. The door frame 12 includes a flat peripheral wall 16 which extends around the window opening 14(FIG. 1), a vertical outside wall 18 which is formed at an outside end of the flat peripheral wall 16, and a protrusion 20 having a closed cross-section, which protrudes along an inside end of the flat peripheral wall 16.

The peripheral wall 16, the vertical outside wall 18, and an outside surface of the protrusion 20 define a channel 22 on an inner side of the flat peripheral wall 16. The channel 22 has a generally U-shaped cross-section opening towards the window opening 14. A glass run 24 is attached in the channel 22. The glass run 24 has seal lips 26 and 28 which respectively project inwardly from ends of opposite side walls 30 and 32 thereof for holding a periphery of the door glass 34 from both sides thereof.

A retainer 36 is provided on an outer side of the peripheral wall 16, and a door weather strip 38 having a base portion 40, a tubular main seal portion 42 and a sub-seal lip portion 44 is attached to the door frame 12 by fitting the base portion 40 in the retainer 36.

In a door opening portion of a vehicle body, a flange 46 is defined by peripheral portions of an inner body panel 48, outer body panel 50 and reinforcing panel 52 which are joined with each other. And an opening weather strip 54 having a tubular seal portion 56 is attached to the flange 46.

When the door 10 is closed, the protrusion 20 of the door frame 12 contacts and presses the seal portion 56 of the opening weather strip 54, the main seal portion 42 of the door weather strip 38 contacts and presses the door opening portion of the outer body panel 50, and an end of the sub-seal lip portion 44 contacts and presses the door opening portion outside the main seal portion 42. The cross-section of the door frame structure, which is taken along the line Y—Y of FIG. 1, is substantially identical to that shown in FIG. 2. Accordingly, explanations thereof will be omitted.

In order to enlarge the freedom of design choice of vehicle doors, and to improve appearance thereof, outside surfaces of metal door frames have been frequently covered with frame mouldings composed of synthetic resins.

The metal door frames are generally coated, but coating color is difficult to select freely. In contrast, synthetic resins enable the free selection of color and gloss thereof, and accordingly, by virtue of the frame mouldings composed of synthetic resins, designing around door frames can be freely chosen.

Generally, frame mouldings are attached to door frames by engaging projections formed along side edges of the frame moulding with side edges of a vertical outside wall of the door frame, or by securing the frame moulding to the vertical outside wall of the door frame with clips which are provided in the frame moulding. These attaching methods are, however, troublesome. In another attaching method, the frame moulding is bonded to the door frame using double-sided adhesive tapes. This attaching method also has the problem that sufficient care must be taken to bond the frame moulding without offset in the attaching position.

The door frame structures including frame mouldings have another problem that there occurs a large level difference between an outside surface of the door glass and an outside surface of the frame moulding. The large level difference degrades appearances around vehicle doors, and undesirably enlarges air resistance therearound during running of motor vehicles. Accordingly, it is desired to decrease such level difference to a minimum. However, as illustrated in FIG. 2, the side wall 32 of the glass run 24, which has the seal lip 28, is located outside the door glass 34, and the vertical outside wall 18 of the door frame 12 is further located outside the side wall 32 to form a level difference S. In addition, where the frame moulding is provided outside the vertical outside wall 18, the level difference is much enlarged.

SUMMARY OF THE INVENTION

Accordingly, it is an object of the present invention to provide a door frame structure having a frame moulding for covering an outside of a door frame of a vehicle door, which is capable of raising the work efficiency in attaching of the frame moulding to the vehicle door.

It is another object of the present invention to provide a door frame structure having a frame moulding, which is capable of decreasing a level difference between a door glass of the vehicle door, and the frame moulding.

It is still another object of the present invention to provide a door frame structure having a simple arrangement, which is capable of improving the productivity of the vehicle door.

The door frame structure in accordance with the present invention includes a metal door frame which has a flat peripheral wall extending around a periphery of a vehicle door to define a window opening, and a protrusion protruding from an inside end of the flat peripheral wall towards the window opening. A glass run for receiving a door glass which is in closed position is provided on an inner side of the peripheral wall of the door frame, and a door weather strip for sealing between the door frame and a door opening portion of a vehicle body is provided on an outer side of the flat peripheral wall of the door frame. And a frame moulding for covering the door frame, which has a plate-like configuration and is composed of a synthetic resin or thermoplastic elastomer, extends along the door frame and is secured to the outside end of the flat peripheral wall of the door frame in about a widthwise center of the frame moulding at about right angles to the flat peripheral wall. The protrusion and the flat peripheral wall of the door frame, and an inner half part of the frame moulding, which protrudes into the window opening inwardly of the outside end of the flat peripheral wall of the door frame, define a channel for providing the glass run therein.

In one embodiment, the glass run includes a main body having a generally U-shaped cross-section, and seal portions projecting inwardly from opening ends of opposite side walls of the main body to seal the door glass on both sides thereof, and the main body of the glass run is fitted in the channel.

In another embodiment, the inner half part of the frame moulding has a seal portion at an inner end thereof, and an L-shaped member is fitted along the flat peripheral wall and the protrusion of the door frame, and the L-shaped member has a seal portion at an inner end thereof so as to face the seal portion of the inner half part of the frame moulding. The inner half part of the frame moulding and the L-shaped member define the glass run.

In a preferred embodiment, the frame moulding has a pair of shelf-like projections which respectively project from about a widthwise center of an inside surface of the frame moulding at about right angles thereto so as to be spaced from each other. By fitting the peripheral wall of the door frame between the shelf-like projections of the frame moulding, the frame moulding is secured to the door frame.

In another preferred embodiment, the frame moulding has a shelf-like projection which projects from about a widthwise center of an inside surface of the frame moulding at about right angles thereto, and the flat peripheral wall of the door frame includes a pair of walls which are spaced from each other. And by fitting the shelf-like projection of the frame moulding between the pair of walls of the flat peripheral wall of the door frame, the frame moulding is secured to the door frame.

In accordance with the present invention, the frame moulding serves as a vertical outside wall of a conventional door frame, and accordingly, the resultant door frame structure becomes simple. In addition, the door frame does not have a conventional vertical outside wall so that the level difference between the frame moulding and the door glass is made small, and the weight of the door frame is reduced. And by fitting the flat peripheral wall of the door frame between the shelf-like projections of the frame moulding, or fitting the shelf-like projection of the frame moulding between the pair of walls of the flat peripheral wall of the door frame, the frame moulding can be secured to the door frame with high work efficiency.

Other objects, features, and characteristics of the present invention will become apparent upon consideration of the following description and the appended claims with reference to the accompanying drawings, all of which form a part of this specification.

BRIEF DESCRIPTION OF THE DRAWINGS

FIG. 3(A) is a side view of a main part of a frame moulding used in a first embodiment of a door frame structure in accordance with the present invention;

FIG. 3(B) is a cross-sectional view of the first embodiment of a door frame structure, which is taken along the line IIIB—IIIB of FIG. 3(A);

FIG. 3(C) is a cross-sectional view of the first embodiment of a door frame structure, which is taken along the line IIIC—IIIC of FIG. 3(A);

DETAILED DESCRIPTION OF THE PREFERRED EMBODIMENTS

FIG. 3(A) illustrates an upper rear corner of a frame moulding of a front door of a vehicle, and FIGS. 3(B) and 3(C) are cross-sectional views of a first embodiment of the present invention, which are respectively taken along the lines IIIB—IIIB and IIIC—IIIC of FIG. 3(A).

Figure 2:
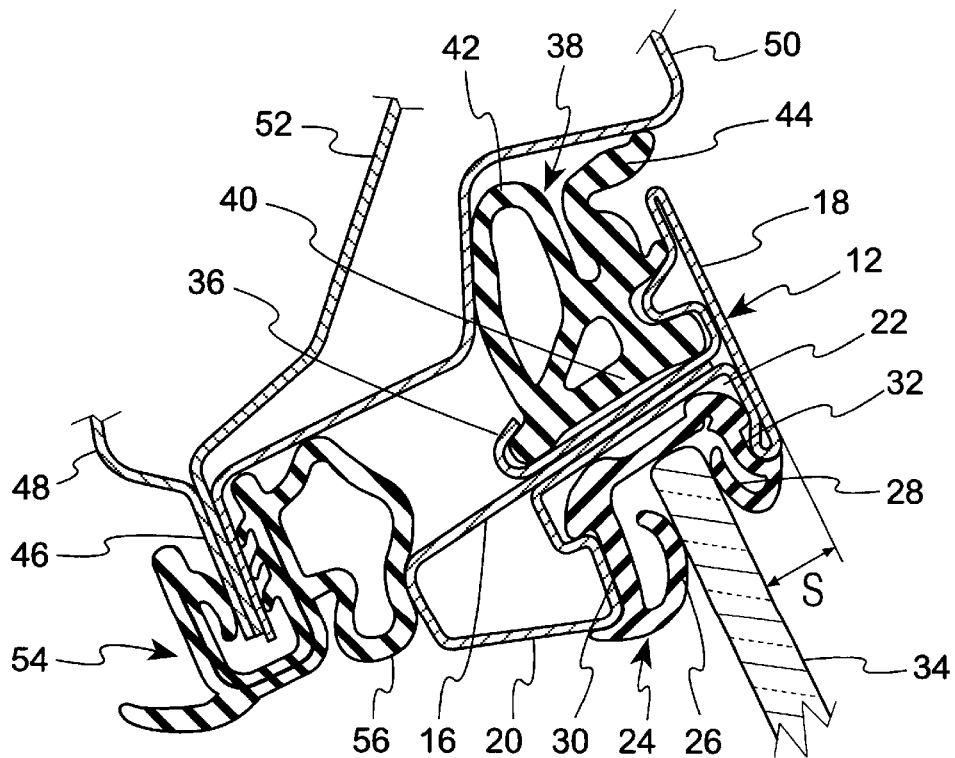
FIG. 2 is a cross-sectional view of a conventional door frame structure, which is taken along the line X—X of FIG. 1.

As shown, a door frame 12A is formed by bending a steel plate by a roller-bending work. The door frame 12A has a flat peripheral wall 60 composed of three sheets of steel plate, which are welded to one another, a tubular protrusion 62 which protrudes from an inside end of the flat peripheral wall 60 towards a window opening, and an engaging part 64 having a C-shaped cross-section, which is formed on an upper side of the peripheral wall 60. The door frame 12A does not have any conventional vertical outside wall like the wall 18 of the conventional door frame 12 (FIG. 2).

The door frame 12A is composed of an upper frame member 66 (FIG. 3(B)) which extends along a roof side of a vehicle body, and a vertical frame member 68 (FIG. 3(C)) which extends along a center pillar of the vehicle body. These frame members 66 and 68 have a substantially identical cross-section to each other, and are joined to each other by welding at an upper rear corner of the door frame 12A. The upper frame member 66 is first formed straight, and then curved by bending to conform to a door opening portion along the roof side. The upper frame member 66 has no vertical outside wall, and accordingly, can be readily curved with a small bending force.

A frame moulding 70 for covering an outside of the door frame 12A is composed of a synthetic resin such as ABS resin, polypropylene or the like, and is formed by injection moulding. The upper frame member 66 is covered with an upper frame moulding 70A and the vertical frame member 68 is covered with a vertical frame moulding 70B. The frame moulding 70 may be also composed of thermoplastic olefin elastomer.

As illustrated in FIGS. 3(A) and 3(B), the upper frame moulding 70A includes a main body 72 having a generally uniform width over an entire length thereof, and a pair of shelf-like projections 74 and 76 which respectively project from about a widthwise center of an inside surface of the frame moulding 70A at about right angles thereto. The projections 74 and 76 are respectively formed over an entire length of the frame moulding 70A to have a thickness slightly less than that of the main portion 72. The projections 74 and 76 face each other through a space. At a closed end of the space, the width thereof is slightly greater than the thickness of the peripheral wall 60 composed of three pieces of metal plate, and at an open end thereof, the width is made slightly less than the thickness of the peripheral wall 60.

The upper frame moulding 70A is secured to the upper frame member 66 by press-inserting the outside end of the peripheral wall 60 of the upper frame member 66 between the opposite ends of the projections 74 and 76 while enlarging the space therebetween, and pushing the main body 72 onto the outside end of the peripheral wall 60.

The main body 72 of the upper frame moulding 70A thus secured has an inner half part 78 which protrudes inwardly of the peripheral wall 60, and faces the protrusion 62 of the door frame 12A. These inner half part 78 of the upper frame moulding 70A, the protrusion 62 and the peripheral wall 60 of which a lower surface is covered with the projection 76 define a channel 80 having a generally U-shaped cross-section which opens downwardly. A projection 82 is formed along a lower end of the lower half part 78 so as to project inwardly.

A glass run 84 is fitted in the channel 80. The glass run 84 has a generally U-shaped cross-section and includes side walls 86 and 88, and seal lips 90 and 92 which project inwardly from open ends of the side walls 86 and 88. When the door glass 34 is elevated to its closed position, the seal lips 90 and 92 seal an upper periphery of the door glass 34 on both sides thereof.

The upper frame moulding 70A further includes an outer half part 94 which extends outwardly of the peripheral wall 60 of the upper frame portion 66. The outer half part 94 has a projection 96 which projects inwardly from an upper end thereof to define an L-like engaging part which faces the C-shaped engaging part 64 of the upper frame member 66.

A door weather strip 98 is attached on an outer side of the peripheral wall 60 of the upper frame member 66. The door weather strip 98 includes a base portion 100, a tubular main seal portion 102, and a sub-seal lip portion 104. The C-shaped engaging part 64 and the L-shaped engaging part 96 engage widthwise ends of the base portion 100 of the door weather strip 98, thereby serving as a retainer for the door weather strip 98.

As illustrated in FIGS. 3(A) and 3(C), the configurations of the vertical frame moulding 70B is identical to those of the upper frame moulding 70A except that the width of the vertical frame moulding gradually enlarges downwardly. In FIG. 3(C), parts similar to those in FIG. 3(B) are given the same number as in FIG. 3(B). An upper end of the vertical frame moulding 70B, which is connected to a rear end of the upper frame moulding 70A, has an approximately identical width to that of the upper frame moulding 70A. The width of the outer half part 94 of the vertical frame moulding 70B gradually enlarges downwardly. The projections 74 and 76 which respectively project from the inside surface of the vertical frame moulding 70B are located at about a width center thereof, and extend downwardly in parallel with an end edge of the inner half part 78. At an upper end of the vertical frame moulding 70B, the engaging part 96 is located at an outer end edge of the outer half part 94 of the frame moulding 70B. The engaging part 96 extends downwardly in parallel with the projection 74.

The vertical frame moulding 70B thus arranged is secured to the peripheral wall 60 of a vertical frame member 68 using the projections 74 and 76. A glass run 84 is fitted in the channel 80 of the vertical frame moulding 70B, and the base portion 100 of the door weather strip 98 is engaged by the C-shaped engaging part 64 of the vertical frame member 68 and the engaging part 96 of the vertical frame moulding 70B.

With the door frame structure of the present embodiment, the frame moulding 70 can be secured to the door frame 12A in a prescribed position with high work efficiency by inserting the outside end of the peripheral wall 60 of the door frame 12A between the projections 74 and 76 of the frame moulding 70, and pushing the frame moulding 70 onto the door frame 12A. In addition, the door frame 12A does not have a conventional vertical outside wall at an outside end thereof. Accordingly, the weight of the door frame 12A is reduced, the material costs thereof become inexpensive, and the level difference between the outside surfaces of the door glass 34 and the frame moulding 70 occurring along a periphery thereof can be decreased. Furthermore, since no vertical outside wall is formed in the door frame 12A, a large bending force is not required to curve the door frame 12A to conform to the door opening portion of the vehicle body. Consequently, the productivity of the door frame 12A is improved. The width of the frame moulding 70 can be arbitrarily varied so that the vehicle doors and the vehicle bodies therearound can be designed freely.

Figure 4:
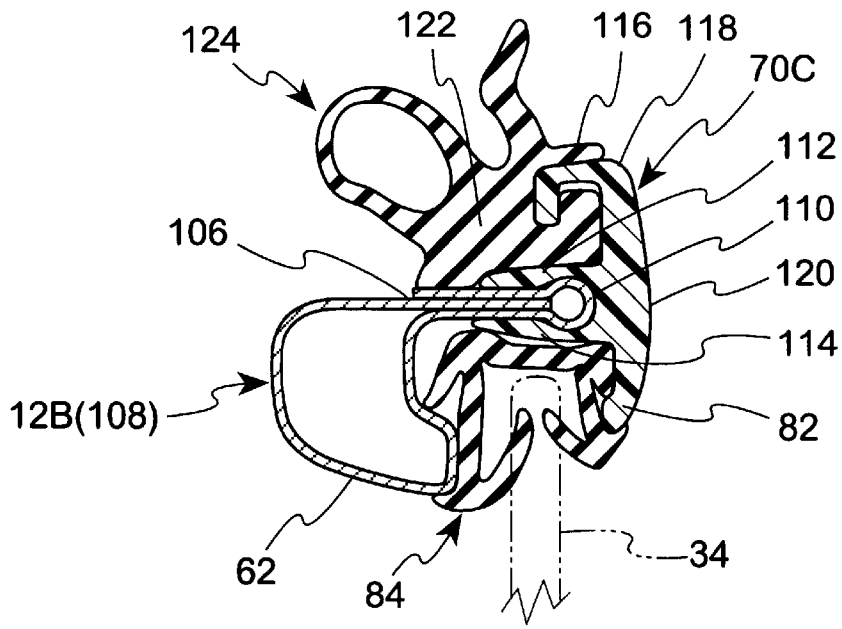
FIG. 4 is a cross-sectional view of a second embodiment of a door frame structure in accordance with the present invention, which is taken along the line IIIB—IIIB of FIG. 3(A)

FIG. 4 illustrates a cross-section of a second embodiment of a door frame structure of the present invention, which is taken along the line IIIB—IIIB of FIG. 3(A). The arrangement of the present embodiment, which differs from the first embodiment, will be mainly explained.

A peripheral wall 106 of an upper frame member 108 of a door frame 12B has a tubular cylindrical outside end 110 of which the diameter is slightly greater than the thickness of a flat part of the peripheral wall 106. Projections 112 and 114 of a frame moulding 70C respectively have a thin-walled base, thereby defining concave facing surfaces for receiving the tubular cylindrical outside end 110. When the frame moulding 70C is attached, the thin-walled bases of the projections 112 and 114 fit with the tubular cylindrical outside end 110 of the peripheral wall 106 to prevent the projections 112 and 114 from slipping along the peripheral wall 106.

An engaging part 116 projects from an outer end of an outer half part 118 of a main body 120 of the frame moulding 70C and bends downwardly to define a downwardly opening groove having a U-shaped cross-section with the main body 120. An outside end of a base portion 122 of a door weather strip 124 has a configuration which fits in the groove defined by the engaging part 116 and the main body 120, thereby attaching the base portion 122 to the upper frame member 108.

The door frame structure around a vertical frame member (not shown) of the door frame 12B is substantially identical to that around the upper frame member 108, which is illustrated in FIG. 4. The remaining arrangements of the door frame structure of the door frame 12B are substantially identical to those of FIGS. 3(A), 3(B) and 3(C), therefore, explanations thereof will be omitted.

Figure 5:
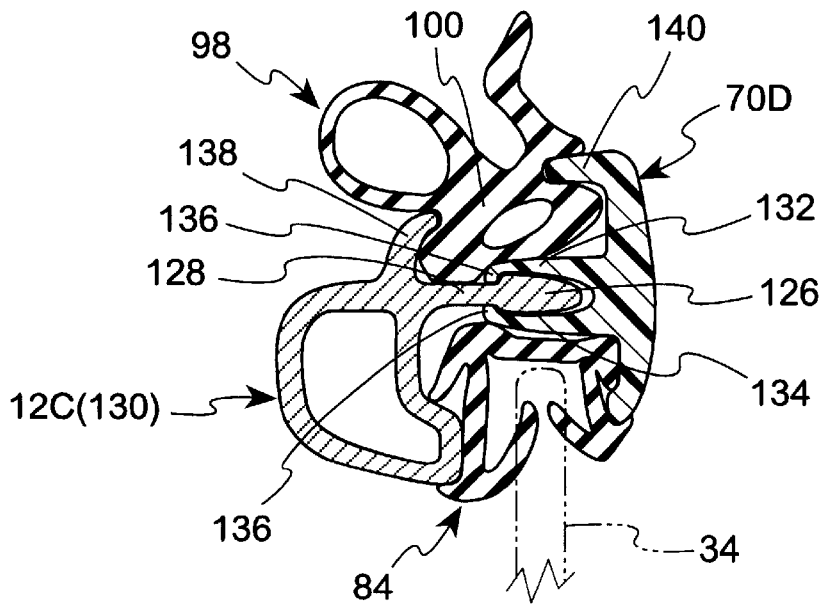
FIG. 5 is a cross-sectional view of a third embodiment of a door frame structure in accordance with the present invention, which is taken along the line IIIB—IIIB of FIG. 3(A)

FIG. 5 illustrates a cross-section of a third embodiment of a door frame structure of the present invention, which is taken along the line IIIB—IIIB of FIG. 3(A). The arrangement of the present embodiment, which differs from the first embodiment, will be mainly explained.

A door frame 12C is composed of aluminum, and is formed by cold drawing. An outside end portion 126 of a peripheral wall 128 of an upper frame member 130 has an arrowhead-like cross-section, and projections 132 and 134 of a frame moulding 70D respectively have a bending end 136. When the frame moulding 70D is attached, the bending ends 136 of the projections 132 and 134 fit with the arrowhead-like outside end portion 126 to prevent the projections 132 and 134 from slipping along the peripheral wall 128.

An engaging part 138 having a C-like cross-section is integrally formed with the peripheral wall 128 on an upper side thereof so as to face an engaging part 140 projecting from an outer end of a main portion of the frame moulding 70D.

The door frame structure around a vertical frame portion (not shown) of the door frame 12C is substantially identical to that around the upper frame portion 130, which is shown in FIG. 5. The remaining arrangements of the door frame structure of the door frame 12C are substantially identical to those of FIGS. 3(A), 3(B) and 3(C), therefore, explanations thereof will be omitted.

With the present embodiment, the door frame is composed of an aluminum material. Accordingly, the door frame can be made light, and readily formed into a desired cross-sectional shape.

In the preceding embodiments, frame mouldings for covering vertical frame members of door frames respectively have a downwardly enlarging width. Instead, frame mouldings, each having a uniform width, may be used. The frame moulding having a uniform width may be formed by extrusion.

Figure 6:
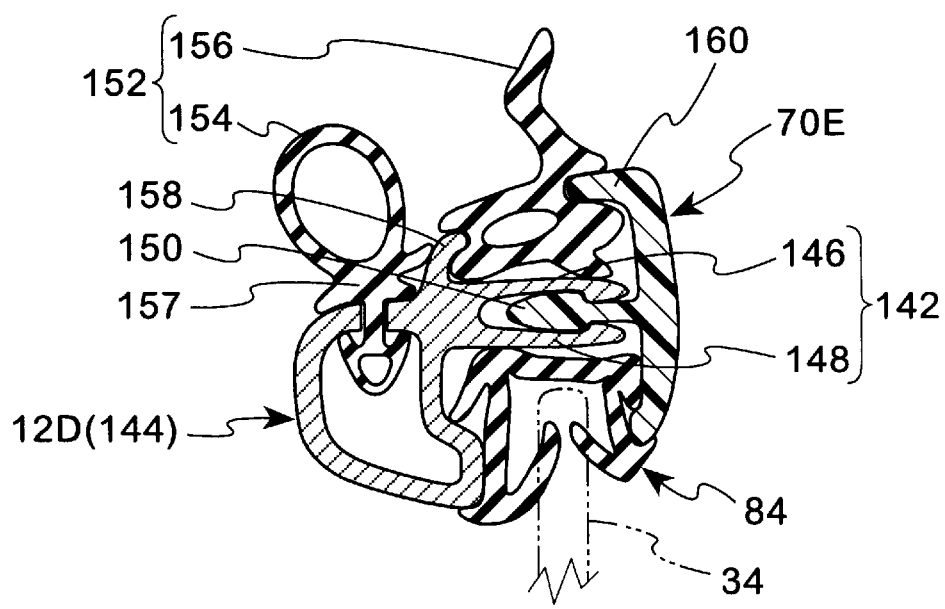
FIG. 6 is a cross-sectional view of a fourth embodiment of a door frame structure in accordance with the present invention, which is taken along the line IIIB—IIIB of FIG. 3(A)

FIG. 6 illustrates a cross-section of a fourth embodiment of a door frame structure of the present invention, which is taken along the line IIIB—IIIB of FIG. 3(A). The arrangement of the present embodiment, which differs from the first embodiment, will be mainly explained.

A door frame 12D is composed of aluminum, and is formed by cold drawing. A peripheral wall 142 of an upper frame portion 144 of the door frame 12D includes an upper wall 146 and a lower wall 148 which project towards the outside of a vehicle body in approximately parallel with each other. The space between the upper and lower walls 146 and 148 is slightly small at projecting ends thereof. A shelf-like projection 150 projects from an inside surface of a frame moulding 70E, and a projecting end of the projection 150 has an arrowhead-like cross-section. When the frame moulding 70E is attached, the projection 150 having an arrowhead-like cross-section fits with the upper and lower walls 146 and 148 of the upper frame member 144 to prevent the projection 150 from slipping along the peripheral wall 142.

In the present embodiment, a door weather strip 152 has a tubular main seal member 154 and a sub-seal member 156, which are formed separately from each other. The main seal member 154 is secured to the upper frame member 144 with clips which are integrally formed in a base part 157 of the main seal member 154. An engaging part 158 having a C-like cross-section is integrally formed with the peripheral wall 142 on an upper side thereof. The engaging part 158 faces an engaging part 160 which projects from an upper end of a main part of the frame moulding 70E. These engaging parts 158 and 160 engage with the sub-seal member 156 and hold the same.

The door frame structure around a vertical frame portion (not shown) of the door frame 12D is substantially identical to that around the upper frame member 144, which is illustrated in FIG. 6. The remaining arrangements of the door frame structure of the door frame 12D are substantially identical to those of FIGS. 3(A), 3(B) and 3(C).

Figure 7:
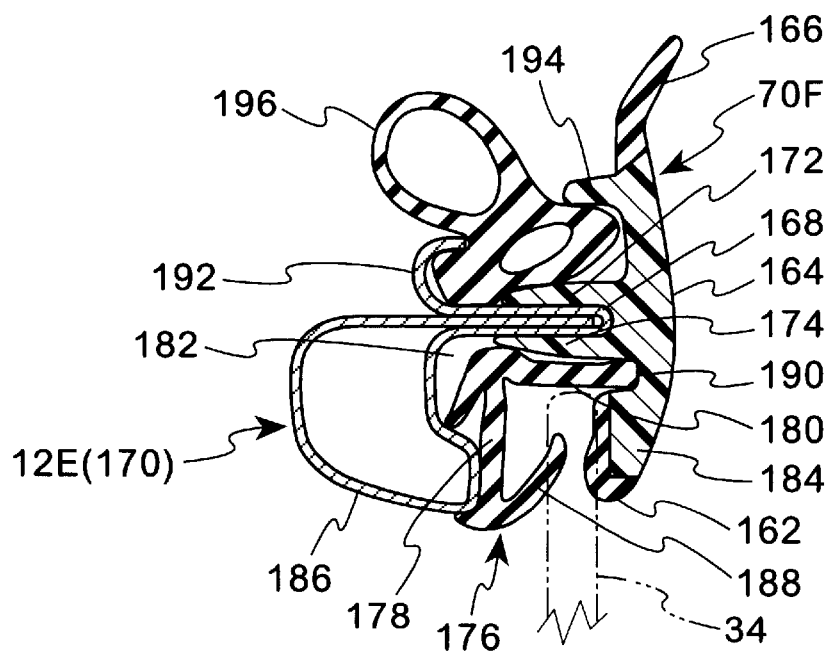
FIG. 7 is a cross-sectional view of a fifth embodiment of a door frame structure in accordance with the present invention, which is taken along the line IIIB—IIIB of FIG. 3(A)

FIG. 7 illustrates a cross-section of a fifth embodiment of a door frame structure of the present invention, which is taken along the line IIIB—IIIB of FIG. 3(A). The arrangement of the present embodiment is substantially identical to that of the first embodiment, which is illustrated in FIG. 3(B), except that the frame moulding of the fifth embodiment serves as one part of a glass run as well as one part of a door weather strip. With the arrangement of the present embodiment, a simple door frame structure can be effected.

A seal portion 162 is formed along an inner end of a main body 164 of a frame moulding 70F integrally therewith, and a seal lip 166 is formed along an outer end of the main part 164 of the frame moulding 70F integrally therewith. These seal portion 162 and the seal lip 166 are composed of a soft material such as a soft rubber or thermoplastic elastomer. The frame moulding 70F is secured to a peripheral wall 168 of an upper frame member 170 of a door frame 12E using a pair of projections 172 and 174 of the frame moulding 70F.

A glass run member 176 having an L-shaped cross-section, which has an inside wall 178 and a bottom wall 180, is fitted in a channel 182 which is defined by an inner half part 184 of the main body 164 of the frame moulding 70F, the peripheral wall 168 and a protrusion 186 of the upper frame member 170. A seal lip 188 is formed along an end of the inside wall 178, and an outside end of the bottom wall 180 fits into a recess 190 formed in an inside surface of the frame moulding 70F. The inner half part 184 of the main body 164 of the frame moulding 70F and the L-shaped glass run member 176 define a glass run.

An engaging part 192 is integrally formed with the peripheral wall 168 on an upper side thereof. The engaging part 192 faces an engaging part 194 which projects from an outer end of the main body 164 of the frame moulding 70F. These engaging parts 192 and 194 engage with a door weather strip 196 which has a tubular seal portion but does not have a sub-seal lip portion. The seal lip 166 serves as the sub-seal portion. With the arrangement that the frame moulding 70F serves as one part of the glass run and one part of the door weather strip, the structure around the door frame can be made simple. In addition, the level difference between the outside surface of the frame moulding 70F and the outside surface of the door glass 34 can be further reduced.

Figure 1:
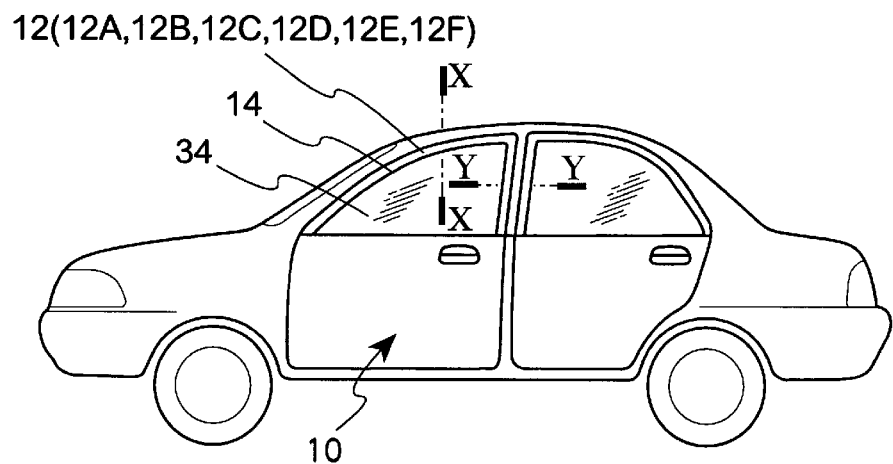
FIG. 1 is a side view of a motor vehicle.
Figure 8A:
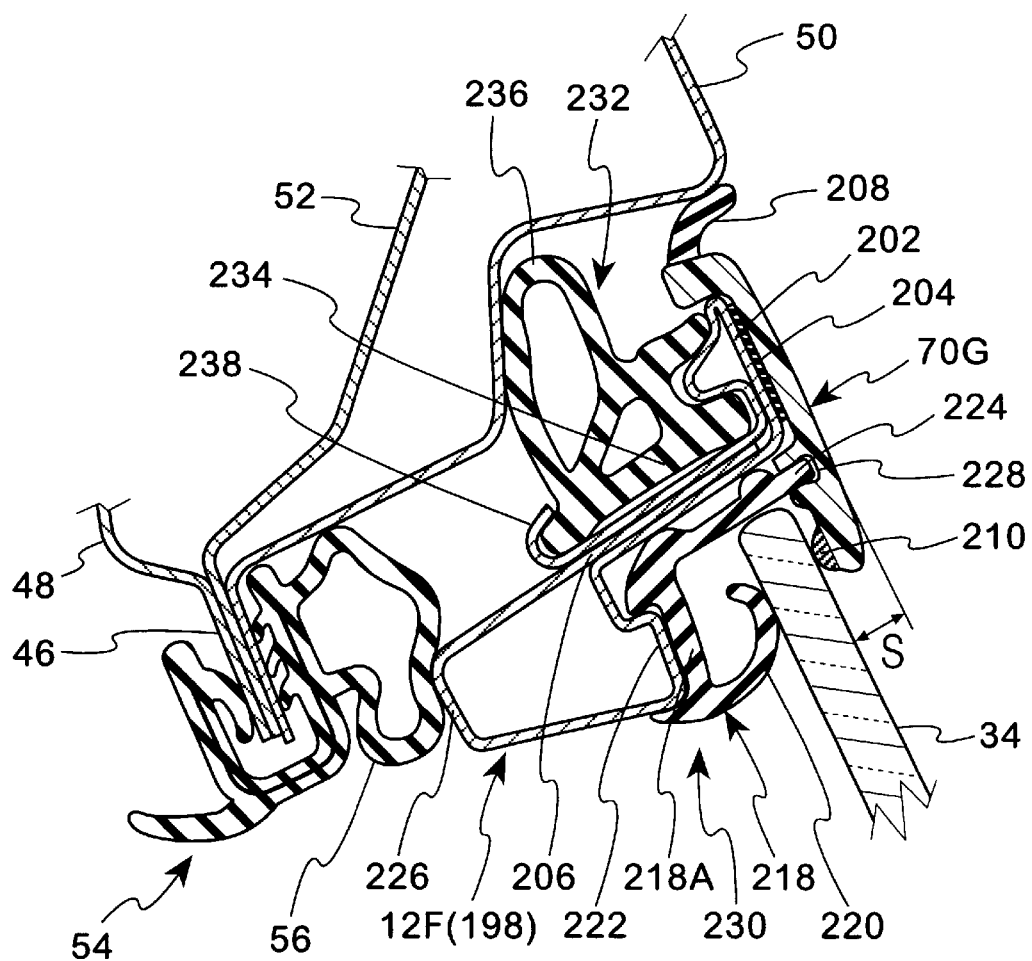
FIG. 8(A) is a cross-sectional view of a sixth embodiment of a door frame structure in accordance with the present invention, which is taken along the line X—X of FIG. 1.
Figure 8B:
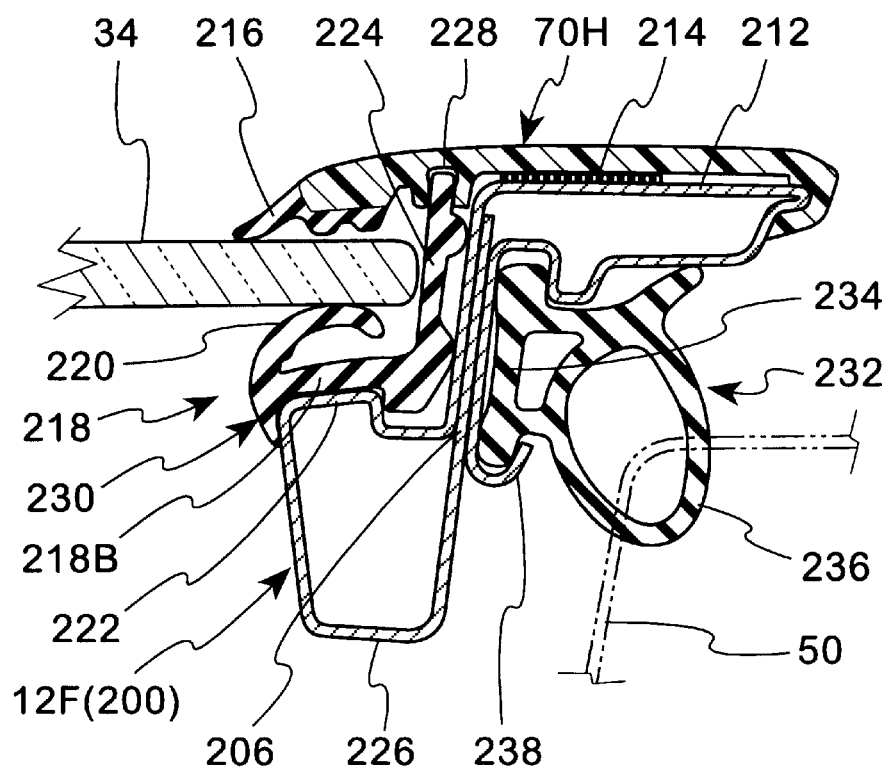
FIG. 8(B) is a cross-sectional view of the sixth embodiment of a door frame structure in accordance with the present invention, which is taken along the line Y—Y of FIG. 1.

FIGS. 8(A) and 8(B) are cross-sectional views of a sixth embodiment of the present invention, which are respectively taken along the lines X—X and Y—Y of FIG. 1. The arrangement of the present embodiment is partly identical to that of the fifth embodiment, which is illustrated in FIG. 7.

As shown, an upper frame moulding 70G is attached to an outside surface of an upper frame member 198, and a vertical frame moulding 70H is attached to an outside surface of a vertical frame member 200. These frame mouldings 70G and 70H are composed of a synthetic resin such as ABS resin, polypropylene or the like, or thermoplastic olefin elastomer (TPO), and are respectively formed by injection moulding into configurations which integrally covers the outside surfaces of the upper frame member 198 and the vertical frame member 200.

As shown in FIG. 8(A), the upper frame member 198 has an outside wall 202 which stands on an outside end of a peripheral wall 206. An outer half part of the upper frame moulding 70G is bonded to the outside surface of the outside wall 202 with a double-sided adhesive tape 204, and an inner half part thereof protrudes inwardly of an outside end of the peripheral wall 206 of the upper frame portion 198 towards a window opening. A seal lip 208 is integrally formed with the frame moulding 70G along an outer end thereof. The seal lip 208 is composed of EPDM rubber or TPO, which is softer than a main body of the upper frame moulding 70G. And a seal portion 210 is formed integrally with the frame moulding 70G along an inner end thereof. The seal portion 210 is composed of the same material as that of the seal lip 208, and has a configuration which slightly protrudes from the inside surface of the upper frame moulding 70G into a triangular cross-section.

As shown in FIG. 8(B), an outside wall 212 of the vertical frame member 200 of the door frame 12F has a width greater than the outside wall 202 of the upper frame member 198. The vertical frame moulding 70H for covering the outside wall 212 of the vertical frame member 200 has a width greater than that of the upper frame moulding 70G. The outer half part of the vertical frame moulding 70H is bonded to the outside wall 212 with a double-sided adhesive tape 214. The inner half part of the vertical frame moulding 70H protrudes inwardly of the outside wall 212 towards a window opening. A lip-shaped seal portion 216 composed of the same material as that of the seal portions 208 and 210 is integrally formed along an inner end of the frame moulding 70H so as to extend obliquely inwardly. The seal portions 208, 210, and 216 are integrally formed with the upper frame moulding 70G and the vertical frame moulding 70G by injection moulding. The main body of each of the frame mouldings 70G and 70H is colored glossy black.

A glass run member 218 having a generally L-shaped cross-section is attached to an inner periphery of the door frame 12F. The L-shaped glass run member 218 is composed of an extruded body of EPDM rubber or TPO. An upper glass run member 218A, which is to be attached to the upper frame member 198, and a vertical glass run member 218B, which is to be attached to the vertical frame member 200, are joined by moulding at approximately right angles to each other. The L-shaped glass run member 218 has a seal lip portion 220 along an end edge of a side wall 222.

The L-shaped glass run member 218 is attached to the door frame 12F over the entire length thereof by positioning the side wall 222 and the other side wall 224 thereof along a tubular protrusion 226 and the peripheral wall 206 of the door frame 12F, respectively, and engaging steps formed in the side wall 222 with steps formed in the protrusion 226 while fitting an outside end edge of the side wall 224 in a recess 228 formed in the inside surface of the frame moulding 70G. Consequently, the L-shaped glass run member 218 and the inner half part of each of the frame mouldings 70G and 70H define a glass run 230 having a generally U-shaped cross-section, which includes seal portions 210 (216) and 220 projecting inwardly from ends of opposite side walls to seal the periphery of the door glass 34 on both sides thereof.

In addition, a door weather strip 232 including a base portion 234 and a tubular seal portion 236 is attached to a retainer 238 on an outer side of the door frame 12F.

In the present embodiment, the structure around a door opening portion of a vehicle body is substantially identical to that of the conventional structure shown in FIG. 2, and accordingly, explanations thereof will be omitted.

With the fifth embodiment shown in FIG. 7, and the sixth embodiment shown in FIGS. 8(A) and 8(B), the frame moulding serves as one side wall of the glass run. Accordingly, the level difference between the outside surface of the frame moulding and the outside surface of the door glass can be further reduced. In addition, by virtue of the seal lip which is formed along an end edge of the outer half part of the frame moulding for contacting and pressing the door opening portion of the vehicle body upon closing of the vehicle door, no seal lip is needed in the door weather strip.

As described above, with the door frame structure of a vehicle in accordance with the present invention, the frame moulding for covering the door frame can be attached with a high work efficiency and without any offset in attachment position. In addition, the frame moulding is attached around the flat peripheral wall of the door frame without providing an outside wall therein, and accordingly, the weight of the door frame can be decreased, and the level difference between the outside surface of the door glass and the outside surface of the frame moulding can be reduced to improve the appearance around the vehicle door, and decrease the air resistance during running of vehicles. Furthermore, the designing around the door frame can be freely chosen merely by changing the configuration and color h of the frame moulding without changing the structure of the door frame.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A door frame structure of a vehicle, comprising:

a door frame composed of metal, said door frame including a flat peripheral wall which extends around a periphery of a vehicle door to define a window opening, and a protrusion which protrudes from an inside end of said flat peripheral wall;

a glass run for receiving a door glass which is in an elevated position, said glass run having a generally U-shaped cross-section, and being attached on an inner side of said flat peripheral wall of said door frame, said glass run having seal portions at opening ends for sealing inside and outside surfaces of the door glass;

a door weather strip for sealing between the door frame and a door opening portion of a vehicle body, said door weather strip is attached on an outer side of said flat peripheral wall of said door frame; and a frame moulding for covering an outside end of said flat peripheral wall of said door frame, said frame moulding having a plate-shaped configuration, and being composed of one of a synthetic resin and a thermoplastic elastomer, said frame moulding extending along said door frame and being secured to said outside end of said flat peripheral wall of said door frame said flat peripheral wall of said door frame including at least one wall of which an outside end has a convex part while said frame moulding has at least one shelf-shaped projection which projects from about a widthwise center of said frame moulding at about right angles to said frame moulding, said at least one shelf-shaped projection of said frame moulding having a concave surface in which said convex part of said at least one wall of said flat peripheral wall of said door frame is adapted to be fitted, whereby said frame moulding is directly attached to said door frame without slipping from said door frame along said peripheral wall, said protrusion of said door frame, said flat peripheral wall of said door frame and an inner half part of said frame moulding, which extends into the window opening inwardly of said outside end of said flat peripheral wall of said door frame, defining a channel for providing said glass run, wherein an outer half part of said frame moulding, which extends from said outside end of said flat peripheral wall of said door frame outwardly of the window opening, has a projection for holding said door weather strip, and said inner half part of said frame moulding has a projection that is formed along a lower end of said inner half part to project inwardly for holding said glass run, and said glass run is fitted in said channel.

2. A door frame structure as claimed in claim 1, wherein said frame moulding has a pair of shelf-shaped projections, which respectively project from about a widthwise center of an inside surface of said frame moulding at about right angles thereto so as to be spaced from each other, and said flat peripheral wall of said door frame is fitted between said pair of shelf-shaped projections of said frame moulding.

3. A door frame structure as claimed in claim 1, wherein said frame moulding has a shelf-shaped projection, which projects from about a widthwise center of an inside surface of said frame moulding at about right angles thereto, and said flat peripheral wall of said door frame includes a pair of walls, which are spaced from each other, and said shelf-shaped projection of said frame moulding is fitted between said pair of walls of said flat peripheral wall of said door frame.

4. A door frame structure as claimed in claim 1, wherein said door frame is composed of an upper frame member, which extends along a roof-side of a vehicle body, and a vertical frame member, which extends along a center pillar of the vehicle body, wherein said frame moulding has a uniform width in a part for covering said upper frame member of said door frame, and has a downwardly enlarging width in another part for covering said vertical frame member of said door frame.

5. A door frame structure of a vehicle, comprising:
a door frame composed of metal, said door frame including a flat peripheral wall which extends around a periphery of a vehicle door to define a window opening, and a protrusion which protrudes from an inside end of said flat peripheral wall;
a glass run for receiving a door glass which is in an elevated position, said glass run being attached on an inner side of said flat peripheral wall of said door frame;
a door weather strip for sealing between the door frame and a door opening portion of a vehicle body, said door weather strip is attached on an outer side of said flat peripheral wall of said door frame; and
a frame moulding for covering an outside end of said flat peripheral wall of said door frame, said frame moulding having a plate-shaped configuration, and being composed of one of a synthetic resin and a thermoplastic elastomer, said frame moulding extending along said door frame and being secured to said outside end of said flat peripheral wall of said door frame in about a widthwise center of said frame moulding at about right angles to said flat peripheral wall, said protrusion of said door frame, said flat peripheral wall of said door frame and an inner half part of said frame moulding, which extends into the window opening inwardly of said outside end of said flat peripheral wall of said door frame, defining a channel for providing said glass run, and an outer half part of said frame moulding, which extends from said outside end of said flat peripheral wall of said door frame outwardly of the window opening, having a projection for holding said door weather strip, wherein said inner half part of said frame moulding has a seal portion at an inner end thereof, and an L-shaped member is attached on an inner side of said flat peripheral wall of said door frame so as to extend along said flat peripheral wall and said protrusion of said door frame, and said L-shaped member has a seal portion at an inner end thereof so as to face said seal portion of said inner half part of said frame moulding, whereby said inner half part of said frame moulding and said L-shaped member define said glass run.

6. A door frame structure as claimed in claim 5, wherein an outer half part of said frame moulding, which extends from said outside end of said flat peripheral wall of said door frame, outwardly of the window opening, has a lip composed of an elastic body having elasticity similar to that of rubber for abutting the door opening portion of the vehicle body when the vehicle door is closed.

7. A door frame structure of a vehicle, comprising:
a door frame composed of metal, said door frame including a flat peripheral wall which extends around a periphery of a vehicle door to define a window opening, and a protrusion which protrudes from an inside end of said flat peripheral wall;
a glass run for receiving a door glass which is in an elevated position, said glass run being attached on an inner side of said flat peripheral wall of said door frame;
a door weather strip for sealing between the door frame and a door opening portion of a vehicle body, said door weather strip is attached on an outer side of said flat peripheral wall of said door frame; and
a frame moulding for covering said flat peripheral wall of said door frame, said frame moulding having a plate-shaped configuration, and being composed of one of a synthetic resin and a thermoplastic elastomer, said frame moulding extending along said door frame and being secured to said door frame such that about a widthwise center of said frame moulding faces said outer side of said flat peripheral wall at about right angles, said protrusion of said door frame, said flat peripheral wall of said door frame and an inner half part of said frame moulding, which extends into the window opening inwardly of said outside end of said flat peripheral wall of said door frame, defining a channel for providing said glass run, said inner half part of said frame moulding having a seal portion at an inner end thereof, and an L-shaped member is attached on an inner side of said flat peripheral wall of said door frame to extend along said flat peripheral wall and said protrusion of said door frame, and said L-shaped member has a seal portion at an inner end thereof to face said seal portion of said inner half part of said frame moulding, whereby said inner half part of said frame moulding and said L-shaped member define said glass run.

8. A door frame structure as claimed in claim 7, wherein an outer half part of said frame moulding, which extends from said outside end of said flat peripheral wall of said door frame, outwardly of the window opening, has a lip composed of an elastic body having elasticity similar to that of rubber for abutting the door opening portion of the vehicle body when the vehicle door is closed.

9. A door frame structure as claimed is claim 7, wherein said door frame is composed of an upper frame member which extends along a roof-side of a vehicle body, and a vertical frame member which extends along a center pillar of the vehicle body, said frame moulding has a uniform width in a part for covering said upper frame member of said door frame, and has a downwardly enlarging width in another part for covering said vertical frame member of said door frame.

* * * * *

UNITED STATES PATENT AND TRADEMARK OFFICE
CERTIFICATE OF CORRECTION

PATENT NO. : 6,679,003 B2
DATED : January 20, 2004
INVENTOR(S) : Masahiro Nozaki and Katsunori Kawai It is certified that error appears in the above-identified patent and that said Letters Patent is hereby corrected as shown below:

<u>Title page,</u>
Item [73], Assignee, please correct "Yotoda Gosei Co., Ltd" to -- Toyoda Gosei Co., Ltd. --

Signed and Sealed this

Eleventh Day of May, 2004

JON W. DUDAS
*Acting Director of the United States Patent and Trademark Office*